United States Patent
Taraki et al.

(10) Patent No.: US 9,213,845 B1
(45) Date of Patent: Dec. 15, 2015

(54) CONTENT ACCESS CONTROL ACROSS MULTIPLE MEDIA DEVICES

(71) Applicant: AMAZON TECHNOLOGIES, INC, Reno, NV (US)

(72) Inventors: Quais Taraki, Bellevue, WA (US); Parag Kumar Garg, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 57 days.

(21) Appl. No.: 13/790,797

(22) Filed: Mar. 8, 2013

(51) Int. Cl.
  *G06F 7/04* (2006.01)
  *G06F 21/60* (2013.01)

(52) U.S. Cl.
  CPC ........................................ *G06F 21/60* (2013.01)

(58) Field of Classification Search
  CPC ..... G06F 21/6218; G06F 21/31; G06F 21/60; G06F 21/10; G06F 2221/2141; H04L 63/10
  See application file for complete search history.

(56) References Cited

U.S. PATENT DOCUMENTS

| | | | | |
|---|---|---|---|---|
| 6,968,384 B1* | 11/2005 | Redding et al. | ............... | 709/229 |
| 7,873,578 B2* | 1/2011 | Johnson et al. | ................. | 705/56 |
| 8,826,169 B1* | 9/2014 | Yacoub et al. | ................ | 715/776 |
| 2004/0044779 A1* | 3/2004 | Lambert | ....................... | 709/229 |
| 2005/0044016 A1* | 2/2005 | Irwin et al. | ...................... | 705/30 |
| 2008/0109911 A1* | 5/2008 | Tedesco et al. | ................. | 726/30 |
| 2008/0148363 A1* | 6/2008 | Gilder et al. | ...................... | 726/4 |
| 2011/0107374 A1* | 5/2011 | Roberts et al. | .................. | 725/46 |

* cited by examiner

*Primary Examiner* — Fikremariam A Yalew
(74) *Attorney, Agent, or Firm* — Lindauer Law, PLLC (57) ABSTRACT

Described herein are systems and methods for controlling access by a user to content across a plurality of media devices. Access content limits may be set and enforced across the plurality of media devices. A user exceeding the limits may be disallowed from access to the content. The content access limits for a user may be specified by one or more of time, cost, content category, and so forth.

21 Claims, 9 Drawing Sheets

CONTENT ACCESS DATA
110

| DEVICE ID 202 | USER ID 204 | CONTENT IDENTIFIER 206 | TIME 208 | COST 210 |
|---|---|---|---|---|
| 104(1) | 102(3) | Upset Cats (game) | 33 m | $3.00 |
| 104(2) | 102(3) | Pythagoras and Fran (video) | 12 m | - |
| 104(1) | 102(1) | A Day in the Life... (eBook) | 67 m | - |
| 104(4) | 102(4) | Othello (audiobook) | 41m | $1.00 |
| 104(3) | 102(2) | Symphony Greats (audio) | 114 m | - |
| 104(7) | 102(2) | Ring (game) | 44 m | - |

⋮

CONTENT ACCESS LIMITS
128

| USER ID 204 | CONTENT CATEGORY 212 | TIME LIMIT 214 | COST LIMIT 216 |
|---|---|---|---|
| 102(1) | Games | 60 m/wk | $5/week |
| 102(1) | eBooks | unlimited | $10/wk |
| 102(1) | Video | 20 m/day | $20/month |
| 102(2) | Game | 15 m/day | - |
| 102(3) | Entertainment | 45 m/day | $5/month |
| 102(3) | Educational | Unlimited | $5/week |
| 102(4) | eBooks | 45 m/day | $30/month |

⋮

CONTENT ACCESS STATUS
130

| USER ID 204 | STATUS 218 | | |
| | EDUCATIONAL 212(1) | GAMES 212(2) | ... |
|---|---|---|---|
| 102(1) | Allowed | Allowed | ... |
| 102(2) | Disallowed | 27 min remaining | ... |
| 102(3) | Disallowed | Disallowed | ... |

300 http://admin.example.com

Welcome User 102(1) "Ward Huxtable"
You are logged in from media device 104(2)

☒ Restrict admin access to this media device.

302

| 102(1) | Ward Huxtable |

304

| CONTENT CATEGORY 212 | TIME LIMIT 214 | COST LIMIT 216 | TIME USED 306 | PAID 308 |
| --- | --- | --- | --- | --- |
| Games | 60 m/wk | $5/week | 17 m | 0 |
| eBooks | unlimited | $10/wk | 217 m | $5 |
| Video | 20 m/day | $20/month | 15 m | $3 |

( Edit )  ← EDIT CONTROL 310

| 102(2) | June Huxtable |

| CONTENT CATEGORY 212 | TIME LIMIT 214 | COST LIMIT 216 | TIME USED 306 | PAID 308 |
| --- | --- | --- | --- | --- |
| unlimited | unlimited | unlimited | 378 m | $27 |

( Edit )

| 102(3) | Chris Huxtable |

| CONTENT CATEGORY 212 | TIME LIMIT 214 | COST LIMIT 216 | TIME USED 306 | PAID 308 |
| --- | --- | --- | --- | --- |
| Educational | Unlimited | $5/week | 11 m | 0 |
| Entertainment | 45 m/day | $30/month | 45 m | $7 |

( Edit )

| 702 | IDENTIFY A USER AT A FIRST MEDIA DEVICE |  |
|---|---|---|
| 704 | RECEIVE FIRST CONTENT ACCESS DATA ASSOCIATED WITH THE FIRST MEDIA DEVICE |  |
| 706 | IDENTIFY THE USER AT A SECOND MEDIA DEVICE |  |
| 708 | RECEIVE SECOND CONTENT ACCESS DATA ASSOCIATED WITH THE SECOND MEDIA DEVICE |  |
| 710 | DETERMINE TOTAL CONTENT ACCESS TIME OF THE USER BASED AT LEAST IN PART ON THE FIRST AND THE SECOND CONTENT ACCESS DATA |  |
| 712 | BASED ON REACHING OR EXCEEDING A CONTENT ACCESS LIMIT ASSOCIATED WITH THE USER, SET A CONTENT ACCESS STATUS TO DISALLOWED AND DISCONTINUE OR DISALLOW ACCESS TO CONTENT |  |

CONTENT ACCESS CONTROL ACROSS MULTIPLE MEDIA DEVICES

BACKGROUND

A wide variety of media devices are available for users to consume an ever growing selection of content. These media devices may include televisions, tablet computers, personal computers, electronic book ("eBook") readers, gaming consoles, set-top boxes, media players, in-vehicle entertainment systems, portable media players, smartphones, and so forth. The content presented by these media devices may include audio, video, eBooks, games, applications, and so forth. The content may be downloaded or streamed from a content provider to the media device.

Users may access the content from the different media devices over time. Placing restrictions on access by particular users may be beneficial. For example, parents may wish to limit how much time a child spends accessing content.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

A user may access content such as audio, video, electronic books ("eBooks"), games, and so forth, with one or more media devices. These media devices may include televisions, tablet computers, personal computers, eBook readers, gaming consoles, set-top boxes, media players, in-vehicle entertainment systems, portable media players, smartphones, and so forth. Access to the content may include receiving a stream of content, retrieving previously stored data, interaction with an external device such as a server, and so forth.

The increasing availability and type of content, combined with the increasingly common presence of media devices may result in situations where placing some limits on access to the content may be beneficial. For example, a parent may wish to set time limits for a child which limit the time spent playing game applications, time spent watching movies, and so forth.

A system for providing content access control across multiple media devices is described. This system allows for the implementation of access controls associated with a specific user, regardless of what media device the user accesses the content with. For example, the parent of user "Chris" may have set content access limits which restrict access to content with a content category of "entertainment" to 45 minutes per day. Regardless of whether the user "Chris" accesses content from a smart phone, tablet, notebook computer, or television, the content access limit is enforced.

Content access data associated with the user is acquired. The content access data is information which describes content access by the user. The content access data may include data indicative of amount of time the content has been accessed, cost associated with access of the content, category type of the content, and so forth. The content access data may be received from media devices, content servers, or other devices associated with providing or supporting access to the content.

The content access limits specify constraints to access associated with a particular user or group of users. These access limits may be based on one or more of time, content category, cost, and so forth. Time limits may be based on time of day, time used, and so forth. These constraints, when reached, may result in access being disallowed, degraded, and so forth. Continuing the example, the parent may have specified that user "Chris" is not allowed to access any content between 10:00 p.m. and 6:00 a.m. local time.

One or more of the content access limits may be modified by one or more conditions. These conditions may include a particular elapsed time period, date or time, access by the user to predetermined content, presence of the user at a predetermined location, and so forth. For example, the limit on the content category "entertainment" may be increased by 10 minutes for every 30 minutes educational content is accessed.

By providing access limits which affect the user across different media devices, limits may be implemented in a consistent and comprehensive fashion. The access limits may be configured using web interfaces, application programming interfaces from other systems, and so forth.

Illustrative System

Figure 1:
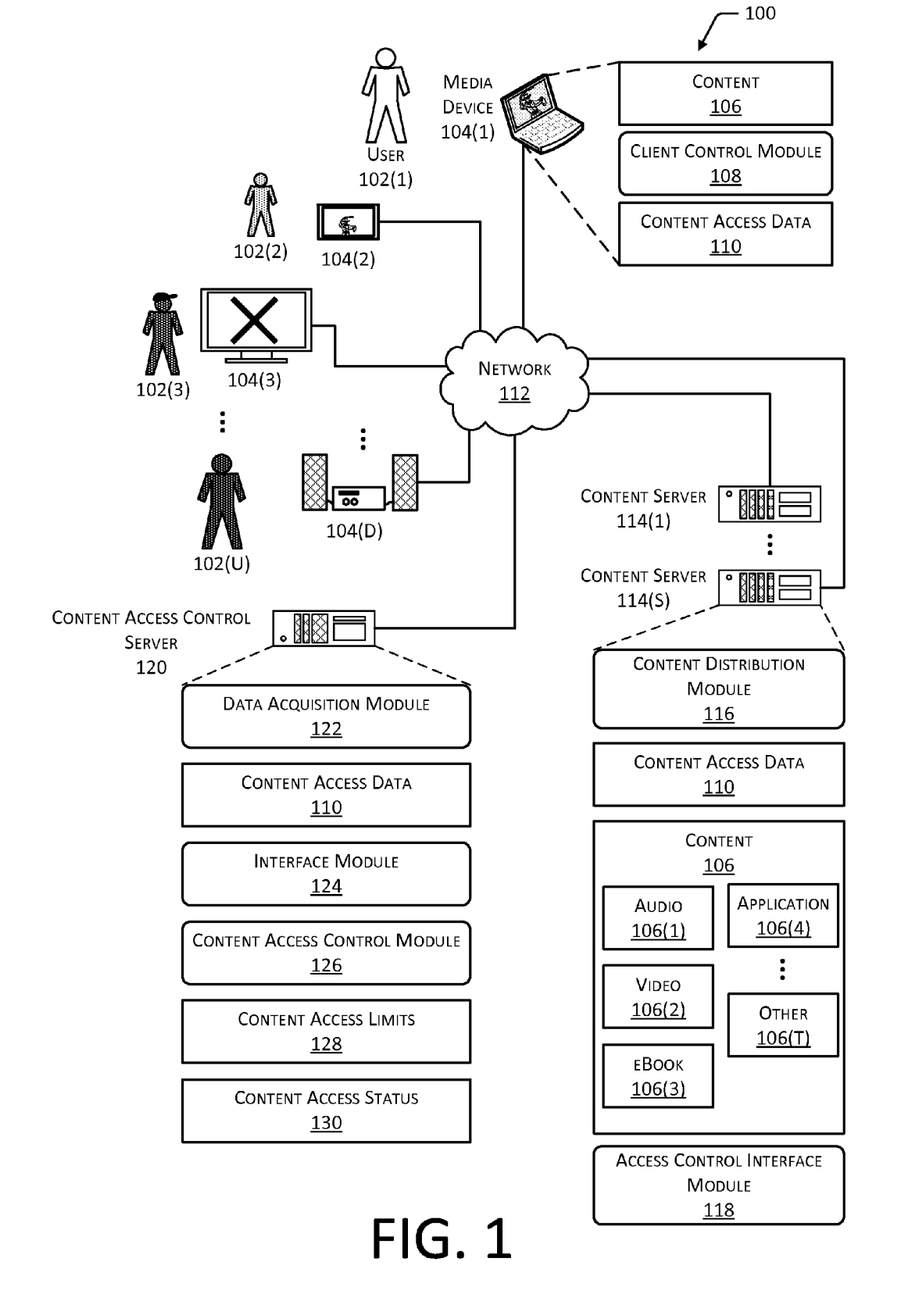
FIG. 1 is an illustrative system providing content access control across multiple media devices based on content access data, content access limits, and content access status.

FIG. 1 is an illustrative system 100 providing content access control across multiple media devices.

Several users 102(1), 102(2), 102(3), . . . , 102(U) are depicted with several media devices 104(1), 104(2), . . . , 104(D). The media devices 104 are configured to present, store, manipulate, or otherwise participate in the access of content 106. The media devices 104 may include televisions, tablet computers, personal computers, electronic book ("eBook") readers, gaming consoles, set-top boxes, media players, in-vehicle entertainment systems, portable media players, smartphones, and so forth.

The media devices 104 may execute on or more modules. These modules may be configured to interact with the content 106 by receiving and processing the content 106 for presentation, generating a stream of the content 106 for presentation, providing various functionality, executing an application, processing a script, and so forth. The media devices 104 are discussed below in more detail with regard to FIG. 4. The content 106 may include audio, video, eBooks, applications, games, and so forth.

The media device 104 may also include a client control module 108. The client control module 108 is configured to support the content access control and is described below in more detail. The client control module 108 may be configured to request or receive data indicating that access to content 106 is restricted. In some implementations, the client control module 108 may be configured to generate content access data 110. The content access data 110 provides information indicative of access by the user 102 to content 106 with the media device 104. The content access data 110 may also include data indicative of amount of time the content 106 has been accessed, cost associated with access of the content 106, category type of the content 106, and so forth. The content access data 110 is discussed in more detail below with regard to FIG. 2.

The media device 104 is configured to connect to one or more networks 112. The one or more networks may include one or more local area networks, public networks such as the Internet, private networks, cellular data networks, or a combination thereof. The network 112 may in turn couple to one or more content servers 114(1), 114(2), . . . , 114(S). The content servers 114 may exchange information with the one or more media devices 104. While the content servers 114 are depicted as single servers, in some implementations the content servers 114 or the functions attributed to the content servers 114 may be provided by a plurality of devices. For example, the content server 114 may be implemented as a virtualized server executing across a plurality of physical servers. Likewise, other servers may be similarly configured.

The content server 114 may include a content distribution module 116. The content distribution module 116 is configured to provide content 106 to the one or more media devices 104 or other devices. The content distribution module 116 may be configured to send content 106, such as by streaming, transfer content 106 files, and so forth. In some implementations the content distribution module 116 may be configured to authorize, authenticate, validate, or otherwise enable operation of the content 106. For example, the content 106 may include an executable application which requires confirmation of licensing with the content server 114 prior to execution. The content distribution module 116 may be configured to generate the content access data 110. The content access data 110 may be generated from user requests for content 106 to stream, information about applications authorized, information based on license key authentication, and so forth.

An access control interface module 118 is also depicted in the content server 114. The access control interface module 118 is configured to couple to the content access control server 120. The content server 114 is configured to request, receive, or request and receive, information indicative of whether the user 102 is allowed access to the content 106 provided by the content server 114. The action of the access control interface module 118 is discussed in more detail below with regard to FIG. 5.

Also coupled to the network 112 is the content access control server 120. As described above, the network 112 enables the media device 104, the content server 114, the content access control server 120, and other devices to exchange information with one another.

The content access control server 120 is configured to acquire content access data 110 and determine whether a particular user 102 is permitted to access content 106. The content access control server 120 may acquire the data using a data acquisition module 122. The data acquisition module 122 may receive data sent from the media devices 104, the content servers 114, or other devices. For example, the client control module 108 may be configured to generate content access data 110 for activities taking place on the media device 104, such as the user 102 playing a game application. In another example, the content server 114 may send content access data 110 generated from transactions occurring on the content server 114.

An interface module 124 in the content access control server 120 is configured to provide one or more interfaces between the content access control server 120 and other devices or services. The interface module 124 may be configured to provide a user interface to the users 102 through the media devices 104. The user interface may be used to configure limits. For example, the user interface may comprise a web page.

Administration of limits associated with a user 102 may be permitted from any of the media devices 104, or may be restricted to a particular media device 104. For example, a parent user 102(1) may configure the content access control server 120 to permit changes to limits when made from the particular media device 104(1), but disregard change requests from other media devices such as 104(2), 104(3), and so forth. This feature may be used to provide additional security to the limits, because the child users 102(2), 102(3), and so forth must have physical access to the media device 104(1) to change their access limits.

The interface module 124 may provide an application programming interface ("API"). For example, the content server 114 may use the API of the interface module 124 to provide content access data 110 to the content server 114 or the media device 104, request information about a user 102, and so forth.

A content access control module 126 accepts as inputs at least a portion of the content access data 110 and at least one or more content access limits 128. The content access limits 128 comprise information which defines constraints on a particular user 102 or group of users' 102 access to content 106. The content access limits 128 are discussed in more detail below with regard to FIG. 2. The content access control module 126 is configured to determine a content access status 130 for the user 102.

The content access status 130 provides information indicative of whether a particular user 102 is permitted to access the content 106. The content access status 130 may be specific to a particular piece of content 106, a particular content category, or other attributes associated with the content 106. For example, the user 102(3) may be permitted time-limited access to content 106 with the content category of "entertainment", while access to content 106 in the "educational" content category is unlimited but restricted to times other than 10:00 p.m. to 6:00 a.m. The content access status 130 is discussed in more detail below with regard to FIG. 2.

In some implementations, the content access control module 126 may be configured to modify one or more of the content access limits 128 based at least in part on the content access data 110. For example, the content access control server 120 may be configured to incentivize consumption of "educational" content 106 by increasing the time allocated for consumption of "entertainment" content 106 when "educational" content 106 is accessed. Continuing the example, reading an educational eBook for 30 minutes may result in the user 102 gaining 10 minutes of "entertainment" time which may be used to play a game application.

When the content access limits 128 for a particular user 102 are reached, the access to the content 106 may be prevented, suspended, or degraded. Prevention may be used when the user 102 requests content 106, but has previously reached one or more of the content access limits 128. For example, the user 102(3) may have no more time left for the content category of "entertainment" and so presentation of a cartoon may be denied. Suspension of access may occur while the content 106 is currently being accessed, but one or more of the content access limits 128 for that user 102 have been reached. For example, playback of the cartoon is paused or stopped and the user 102(3) cannot resume playback until the content access limits 128 permit. Degradation of content 106 may be used to discourage further access to content 106, without abruptly stopping access. For example, presentation of audio or video may be made at a lower resolution, application execution may be slowed, additional latencies may be introduced into interaction, and so forth.

In these illustrations, the content access control server 120 is described as maintaining the content access data 110 across the media devices 104. In other implementations, the content access data 110 for the user 102 may be distributed across a plurality of devices. For example, the content access data 110 at the content access control server 120 may include information on usage from the content servers 114 and the media devices 104(2)-(5), but may omit the content access data 110 from the media device 104(1). In addition to, or instead of, the content access status 130, the content access data 110, or a summary or extract thereof, maybe provided to the client control module 108 executing on the media device 104(1). The client control module 108 may then be configured to make the determination, based on one or more of the locally stored content access data 110, the content access data 110 received from the content access control server 120, the received content access status 130, or other data.

Figure 2:
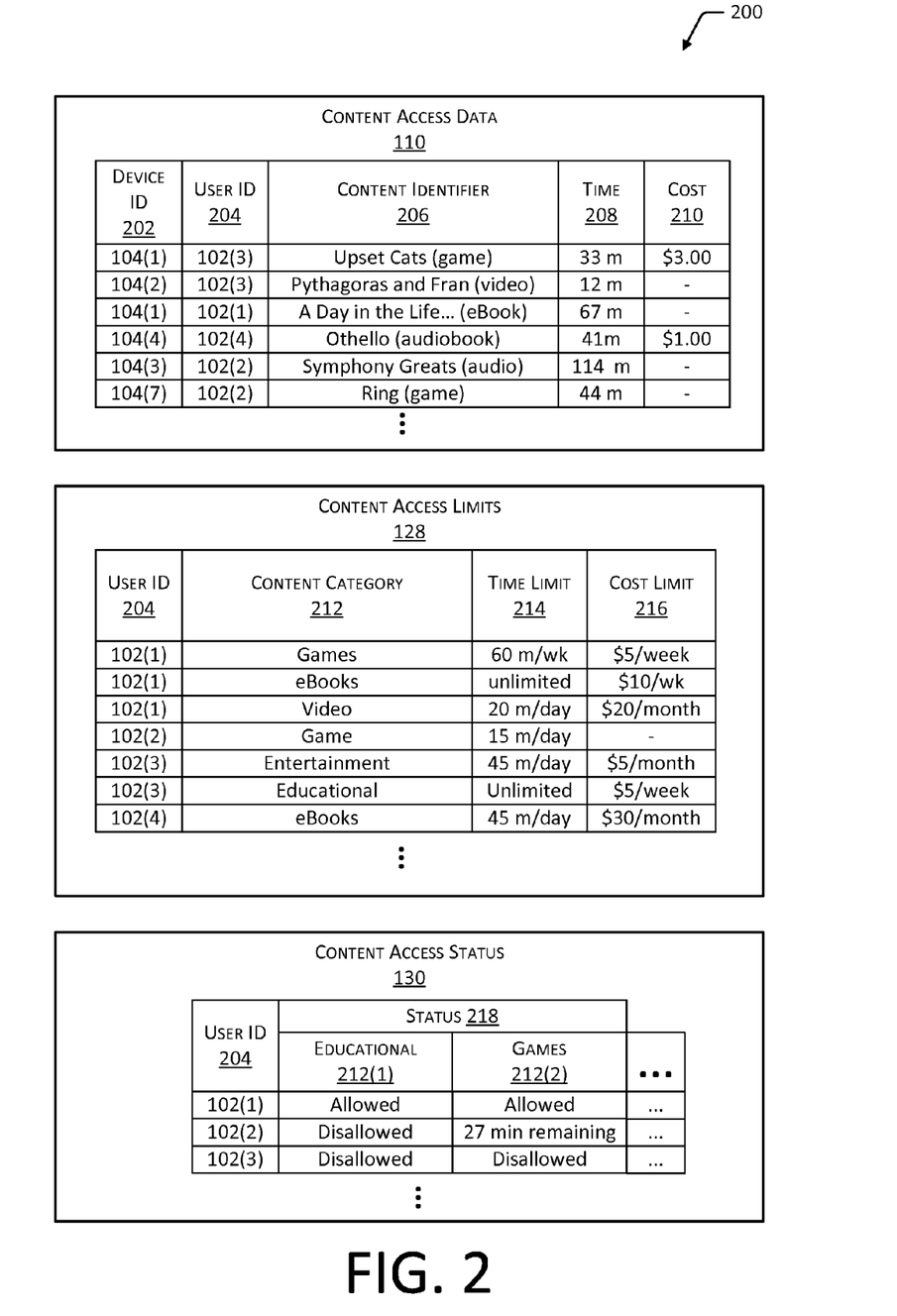
FIG. 2 illustrates content access data, content access limits, and content access status.

FIG. 2 illustrates schematics 200 of pieces of data including the content access data 110, the content access limits 128, and the content access status 130 in more detail. As described above, the content access data 110 provides information indicative of access by the user 102 to content 106 with the media device 104. The content access data 110 may be provided by one or many devices, such as the media devices 104, the content servers 114, or other devices such as routers.

The content access data 110 may include a device identifier ("device ID") 202. The device identifier 202 provides information which is indicative of a particular device which is involved in the access of the content 106. For example, the device identifier 202 may include a serial number or media access control ("MAC") address for the media device 104, of the content server 114, and so forth.

A user identifier ("user ID") 204 provides information indicative of a particular user 102. For example, the user ID 204 may be a login name, serial number, biometric identifier, and so forth.

The content access data 110 may include a content identifier 206. The content identifier 206 provides information indicative of a particular piece of content 106. This may include a title, serial number, content server identification string, access code, hyperlink, web address, and so forth.

Time 208 and cost 210 data associated with access to the content 106 may also be stored. In one implementation, the time 208 may include total time elapsed for access to the content 106. The cost 210 provides information associated with the cost in terms of currency, points, and so forth, which has been used to access the content 106. In some implementations, the content access data 110 may include content category information, such as described below.

The content access data 110 may provide a comprehensive set of information about the access to content 106. For example, as illustrated here, the media device 104(1) was used by user 102(3) to play the game "Upset Cats" for 33 minutes, which cost $3.00.

In some implementations, the content access data 110 may be compiled from several different sources. For example, the time 208 and cost 210 data may be acquired from the content server 114 while the user ID 204 may be retrieved from the media device 104(1).

As described above, the content access limits 128 comprise information which defines constraints on a particular user 102 or group of users' 102 access to content 106. These constraints may be defined in terms of time, cost, location, media device 104 used to access, proximity of other users 102, and so forth.

The content access limits 128 depicted here include the user ID 204. The user ID 204 allows a particular constraint to be applied to a particular user 102. In some implementations the constraints may be applied to a group of users 102. In such implementations, a group ID may be used instead of a user ID 204.

Information about a content category 212 or other attribute may be stored. The content category 212 data is used to provide finer grain control over the content 106. The content category 212 may be manually or automatically designated. For example, a human operator may specify during intake of content 106 to the content server 114 that the content 106 is associated with one or more content categories 212. The content categories 212 may include games, eBooks, video, games, entertainment, educational, and so forth. The content categories 212 may also designate the type of content 106, such as eBooks or video. The content categories 212 may also designate what is in the content 106, such as entertainment or educational. In some implementations, additional attributes may be used to specify content access limits 128. For example, videos or games may be limited based on ratings data provided by ratings organizations such as the Motion Picture Association of America ("MPAA") or the Entertainment Software Rating Board ("ESRB").

Time limits 214 or other time-based constraints may be specified in the content access limits 128. For example, as illustrated here, the user 102(1) is limited to 60 minutes per week of content 106 which is in the content category 212 of "games". Other time-based constraints may also be specified such as particular hours, days of the week, and so forth, during which access to content 106 is either permitted or disallowed.

Cost limits 216 may also be specified. For example, the user 102(1) is limited to incurring a cost of $5 per week for accessing content 106 which is in the "games" content category 212. As shown, the content access limits 128 may thus specify one or more of a maximum time limit 214, a maximum cost limit 216, content category 212, and so forth.

Other limits may also be provided. For example, physical geographic location limits may be used to further specify constraints. For example, content 106 with an MPAA rating of "R" may be disallowed while the media device 104 is used by the user 102(3) on school grounds.

The content access limits 128 may also include blacklists or whitelists. The blacklists may specify content 106 which is never permitted to be accessed by the user 102. In comparison, the whitelists may specify content 106 which is approved for access by the user 102. In some implementations, the blacklists or whitelists may override the other constraints. For example, even if the user 102(3) has plenty of time available to play a game, the blacklist may prevent any access to the game "Upset Cats".

The constraints defined in the content access limits 128 may be modified by one or more conditions. The conditions are configured to initiate modification of the content access limits 128 based on an event or input. The modification may include adding or subtracting from the time limit 214, cost limits 216, and so forth. The conditions may include an elapsed time period, particular date or time, access by the user 102 to predetermined content 106, presence of the user 102 at a predetermined physical location, input from a third-party such as academic test results from a school, and so forth. For example, the content access control server 120 may receive data from a school, and when the student user 102(3) earns a grade above a threshold set by the parent user 102(1), additional time may be added to the time limit 214 for the content category 212 of "games" for the student user 102(3). In another example, for every 30 minutes of access by the student user 102(3) of an eBook with the content category 212 of "educational", the time limit 214 for the content category 212 of "games" may be increased by 10 minutes.

The conditions to modify the constraints may be configured to allow accrual of time, cost, or other parameters. For example, the content access limits 128 may be configured to allow the user 102(3) to "save" or accumulate time limit 214 for the content category 212 of "games", allowing time which is unused to roll into a next time period, such as the next week. These constraints may be capped at a maximum allowed time, cost, and so forth.

The content access status 130 is configured to provide information indicative of whether a particular user 102 is permitted to access the content 106. The content access status 130 may be specific to a particular piece of content 106, a particular content category 212, particular type of content 106 such as audio, video, eBook, application, or other attributes associated with the content 106. The content access status 130 may be expressed as a single bit value such as "yes" or "no" for all access, or as a more detailed expression indicating the content access status 130 for a plurality of different content categories 212 or other designations.

In one implementation illustrated here, the content access status 130 includes the user ID 204 and a status 218. The status 218 in this implementation is binary, indicating whether access is allowed or disallowed. In this illustration, status 218 is provided for two content categories 212 of "educational" 212(1) and "games" 212(2). As shown here, the user 102(1) is allowed to access both "educational" 212(1) and "games" 212(2); the user 102(2) is disallowed to access "educational" 212(1) but allowed to access "games" 212(2); and the user 102(3) is disallowed to access both "educational" 212(1) and "games" 212(2). The content access status 130 may include information about how much time, cost, and so forth, is available before access is denied. For example, the status 218 for the user 102(2) shows that "games" 212(2) are allowed but have 27 minutes remaining as of the time of the content access status 130 before being disallowed.

The content access status 130 may also include other data. In one implementation, an expiration condition for which that content access status 130 is deemed valid may be provided. The expiration condition may determine whether the content access status 130 is deemed valid for use or invalid and an updated content access status 130 is to be requested. The expiration condition may include specific date or time, total of minutes of content 106 accessed, and so forth.

In some implementations, the content access status 130 is distinct from other access rights, permissions, credentials, and so forth, which may be associated with the content 106. Furthermore, the content access status 130 may operate independently of the content access limits 128. For example, the user 102(3) is unable to access content 106 for which they lack the digital rights management credentials, regardless of whether the content access limits 128 allow presentation of that content 106.

The content access data 110, the content access limits 128, and the content access status 130 are depicted as tables. However, other data structures may be used. Furthermore, the same table or data structure may be used to store the data described, or the data may be distributed across different data structures in other configurations.

Figure 3:
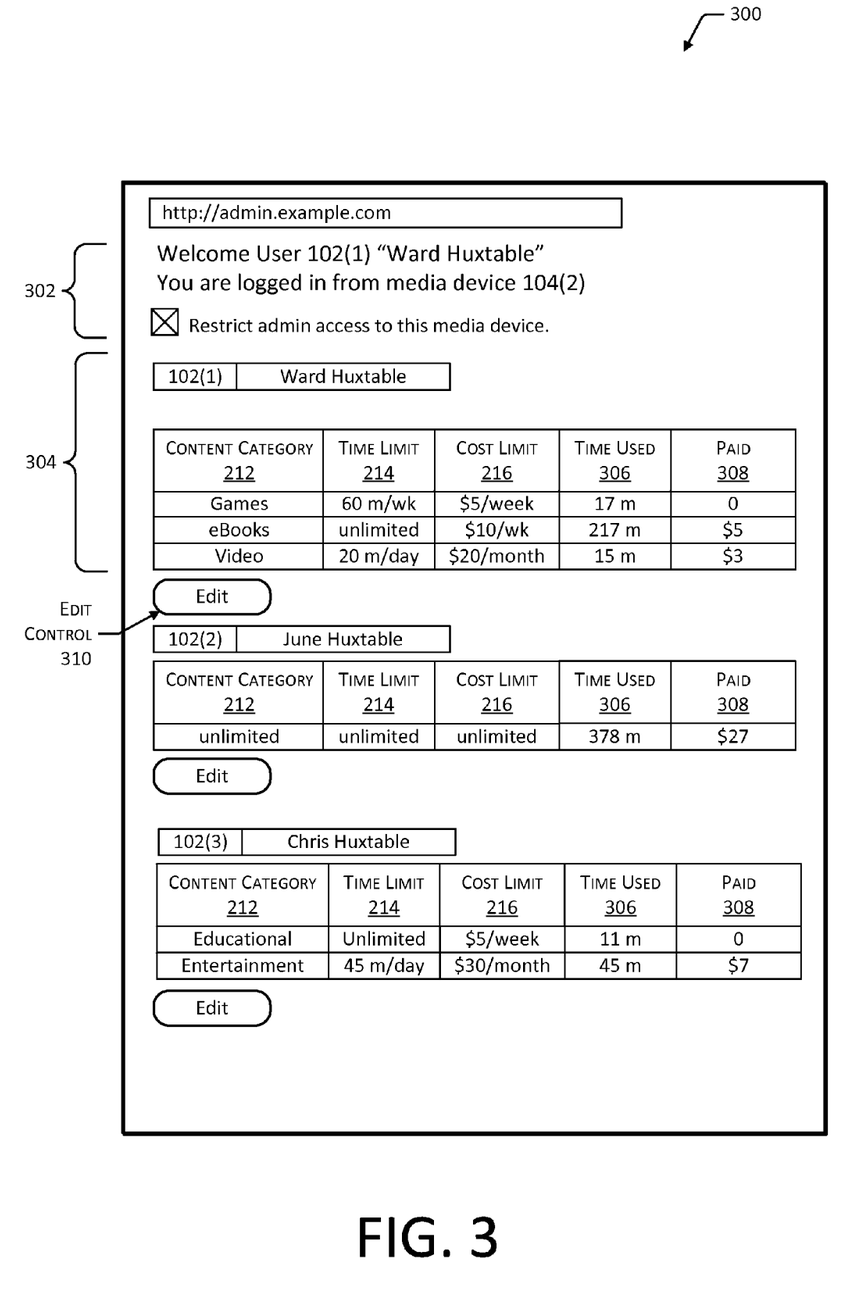
FIG. 3 illustrates a user interface for administering content access limits by user.

FIG. 3 illustrates a user interface 300 for administering content access limits 128. In some implementations, the user interface 300 may be generated at least in part by the interface module 124 of the content access control server 120. The user interface 300 here is depicted as a hypertext markup language ("HTML") page which may be rendered and presented by a web engine or browser. In other implementations, the user interface 300 may be provided by a dedicated application or as part of another application. For example, the user interface 300 may be provided by an application executing on a smartphone.

A header section 302 of the user interface 300 provides information such as the identity of the user 102 currently logged into the user interface 300, the identity of the media device 104 used, and so forth. For example, the user 102(1) named "Ward Huxtable" is currently logged in from the media device 104(2). As described above, in some implementations, administrative functions may be locked to a particular media device 104. This may provide an additional layer of security to avoid unwanted changes to the content access limits 128. For example, the parent user 102(1) may use this function to restrict administrative access to the particular media device 104, such as user 102(1)'s personal smartphone.

A user detail section 304 provides information about the content access limits 128. For example, as shown here, the content category 212, time limit 214, cost limit 216, and so forth, may be presented. Usage may also be presented, such as time used 306, amount paid 308, and so forth. This information may be useful to the user 102 to see current status, such as whether they are close to approaching a limit, or have already been locked out. In some implementations, the content access status 130 may also be presented. The usage data may be reset or updated to correspond to conditions associated with the content access limits 128. For example, where the content access limits 128 are for a set number of minutes each day, the time used 306 may be reset to zero at the start of a new day.

The user 102 may use the user interface 300 to add, remove, change, or otherwise modify the content access limits 128. For example, an edit control 310 may be presented, which when activated allows the user 102 to change one or more of the content access limits 128 or a portion thereof.

Figure 4:
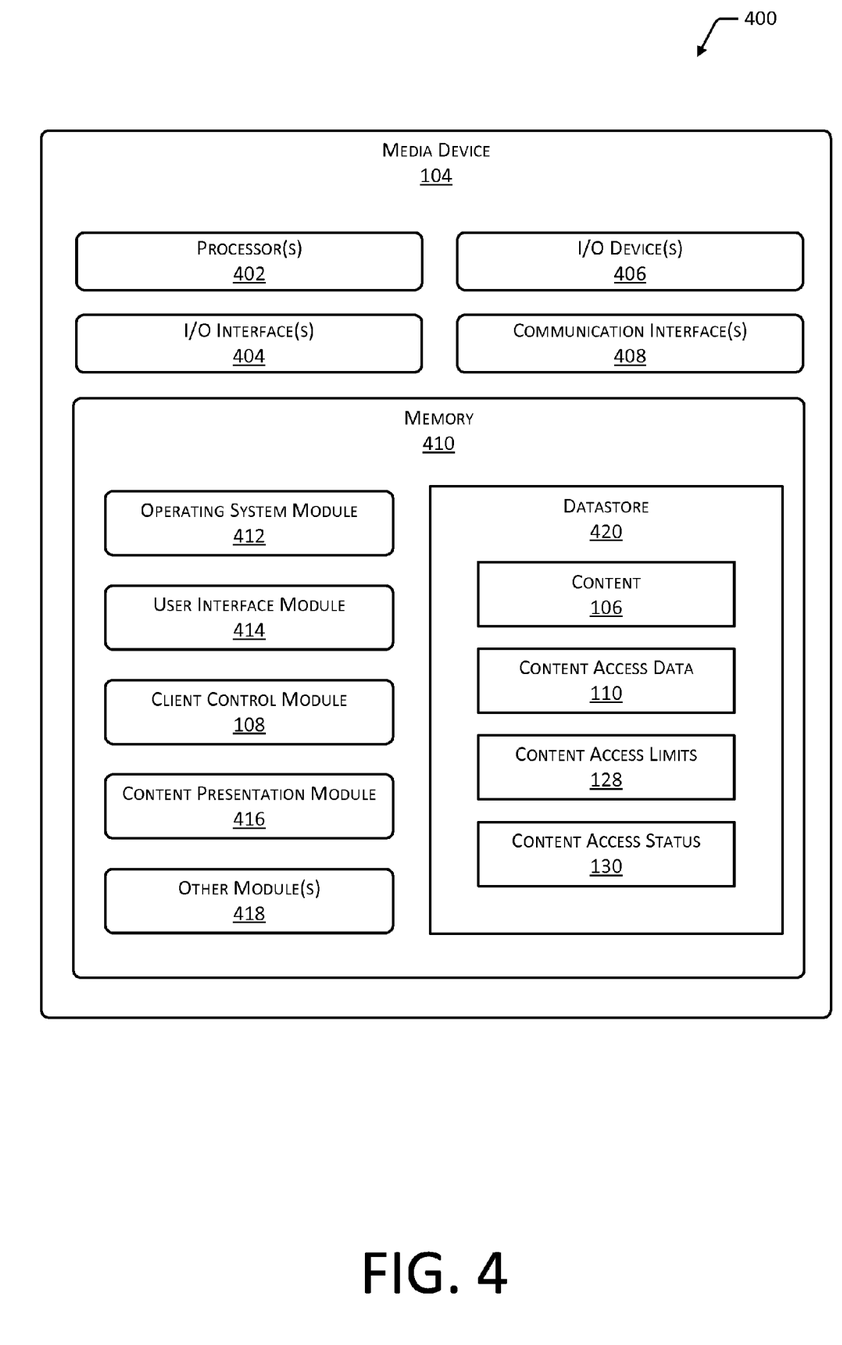
FIG. 4 illustrates a block diagram of a media device configured to support content access control based at least in part on content access status of a user.

FIG. 4 illustrates a block diagram 400 of the media device 104 configured to support content access control based at least in part on the content access status 130 of the user 102. The media device 104 may include one or more processors 402 configured to execute one or more stored instructions. The processors 402 may comprise one or more cores. The media device 104 may include one or more input/output ("I/O") interface(s) 404 to allow the processor 402 or other portions of the media device 104 to communicate with other devices. The I/O interfaces 404 may comprise inter-integrated circuit ("I2C"), serial peripheral interface bus ("SPI"), Universal Serial Bus ("USB") as promulgated by the USB Implementers Forum, RS-232, High Definition Multimedia Interface ("HDMI") as promulgated by HDMI Licensing LLC, TOSLINK® as promulgated by Toshiba Corp., analog video, analog audio, IEEE 1394 as promulgated by the Institute for Electrical and Electronics Engineers, and so forth.

The I/O interface(s) 404 may couple to one or more I/O devices 406. The I/O devices 406 may include input devices such as one or more of a camera, keyboard, a microphone, fingerprint sensor, a touch sensor, a button, radio frequency identification reader, near field communication receiver, security token reader, and so forth. The I/O devices 406 may also include output devices such as one or more of a display, audio speakers, haptic output device, projector, and so forth. In some embodiments, the I/O devices 406 may be physically incorporated with the media device 104 or may be externally placed.

The media device 104 may also include one or more communication interfaces 408. The communication interfaces 408 are configured to provide communications between the media device 104 and other devices such as other media devices 104, routers, access points, the content servers 114, and so forth. The communication interfaces 408 may be configured to couple to the network 112. For example, the communication interfaces 408 may include an Ethernet interface, Wi-Fi® interface, Bluetooth® interface, ZigBee® interface, and so forth.

The media device 104 may also include one or more busses or other internal communications hardware or software that allow for the transfer of data between the various modules and components of the media device 104.

As shown in FIG. 4, the media device 104 includes one or more memories 410. The memory 410 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 410 provides storage of computer readable instructions, data structures, program modules, and other data for the operation of the media device 104.

The memory 410 may include at least one operating system (OS) module 412. The OS module 412 is configured to manage hardware resource devices such as the I/O interfaces 404, the I/O devices 406, the communication interfaces 408, and provide various services to applications or modules executing on the processors 402. Also stored in the memory 410 may be one or more of the following modules. These modules may be executed as foreground applications, background tasks, daemons, and so forth.

A user interface module 414 is configured to provide a user interface to the user 102 using the I/O devices 406 and accept inputs received from the I/O devices 406. The user interface may include one or more visual, audible, or haptic elements. For example, the user interface may be configured to provide a graphic user interface, an audible user interface, and so forth.

The client control module 108 may be stored in the memory 410. As described above, the client control module 108 may be configured to request or receive data indicating that access to content 106 is restricted. For example, the client control module 108 may send a request to the content access control server 120 for the content access status 130 of the user 102 attempting to access the content 106 on the media device 104. In another implementation, the content access control server 120 may "push" or send the content access status 130 to the media devices 104 without request.

The client control module 108 may be configured to generate content access data 110. For example, the client control module 108 may be equipped to examine system logs or other usage data generated by the OS module 412 or other modules to generate the content access data 110.

The client control module 108 may also be configured to interface with the OS module 412 to allow or disallow execution of content 106 such as applications. For example, upon receiving a command to execute a game application, the OS module 412 may request the current content access status 130 from the client control module 108. The client control module 108 may either retrieve locally stored or determined content access status 130, or may request the content access status 130 maintained by the content access control server 120.

In some implementations, the client control module 108 may be configured with an offline mode for use when the content access control server 120 is unavailable. The offline mode may use a last known content access status 130. For example, the last known content access status 130 may indicate the user 102 is permitted another 45 minutes of access to the content 106. After 45 minutes of use in the offline mode, further access may be denied.

In offline mode, the last known content access status 130 may be used in conjunction with locally stored content access limits 128. For example, the last known content access status 130 may indicate that access is allowed but may or may not include data about how much access is permitted. The locally stored content access limits 128 may indicate a time limit 214 of 45 minutes. Where the amount of time used 306 is not known, the locally stored content access limits 128 may be used to cap access on the particular offline media device 104 to 45 minutes.

In another implementation, the offline mode may provide limited access to the content 106, or may degrade the access to the content 106. For example, the client control module 108 may be configured to instruct the OS module 412 to lower a display frame rate of the application to one-half normal operating value.

The client control module 108 may also be configured to work in conjunction with a content presentation module 416 to allow or deny access to the content 106. The content presentation module 416 is configured to present the content 106 to the user 102. For example, the content presentation module 416 may be configured to play an audio file, video file, or present still images which have been previously stored or which are streamed from another device, such as the content server 114.

In one implementation, the client control module 108 may be configured to limit access to the content presentation module 416. For example, when content access limits 128 have been reached, the client control module 108 may prevent the content presentation module 416 from executing.

In another implementation, the client control module 108 may be configured to work in conjunction with the content server 114 to allow or deny access. For example, the client control module 108 may receive data indicative of a request from the content presentation module 416 made to the content server 114 for the presentation of content 106. The content presentation module 416 may send the content access status 130 to the content server 114, request the content server 114 request the content access status 130 from the content access control server 120, or request that the content access control server 120 send the content access status 130 to the content server 114. The content server 114 may be configured to respond to the content access status 130, such that access or delivery of the content 106 is based at least in part on the content access status 130.

Other modules 418 may also be present. For example, a digital rights management module may provide support for presenting or processing content 106, which is protected using one or more digital rights management schemes.

The memory 410 may also include a datastore 420 to store information. The datastore 420 may use a flat file, database, linked list, tree, or other data structure to store the information. In some implementations, the datastore 420 or a portion of the datastore 420 may be distributed across one or more other devices including servers, network attached storage devices and so forth.

The datastore 420 may store a portion of the content 106 or the entire piece of content 106. The datastore 420 may also store content access data 110, content access limits 128, content access status 130, and so forth. Other data may also be stored. For example, the other data may include user preferences, configuration files, and so forth.

Figure 5:
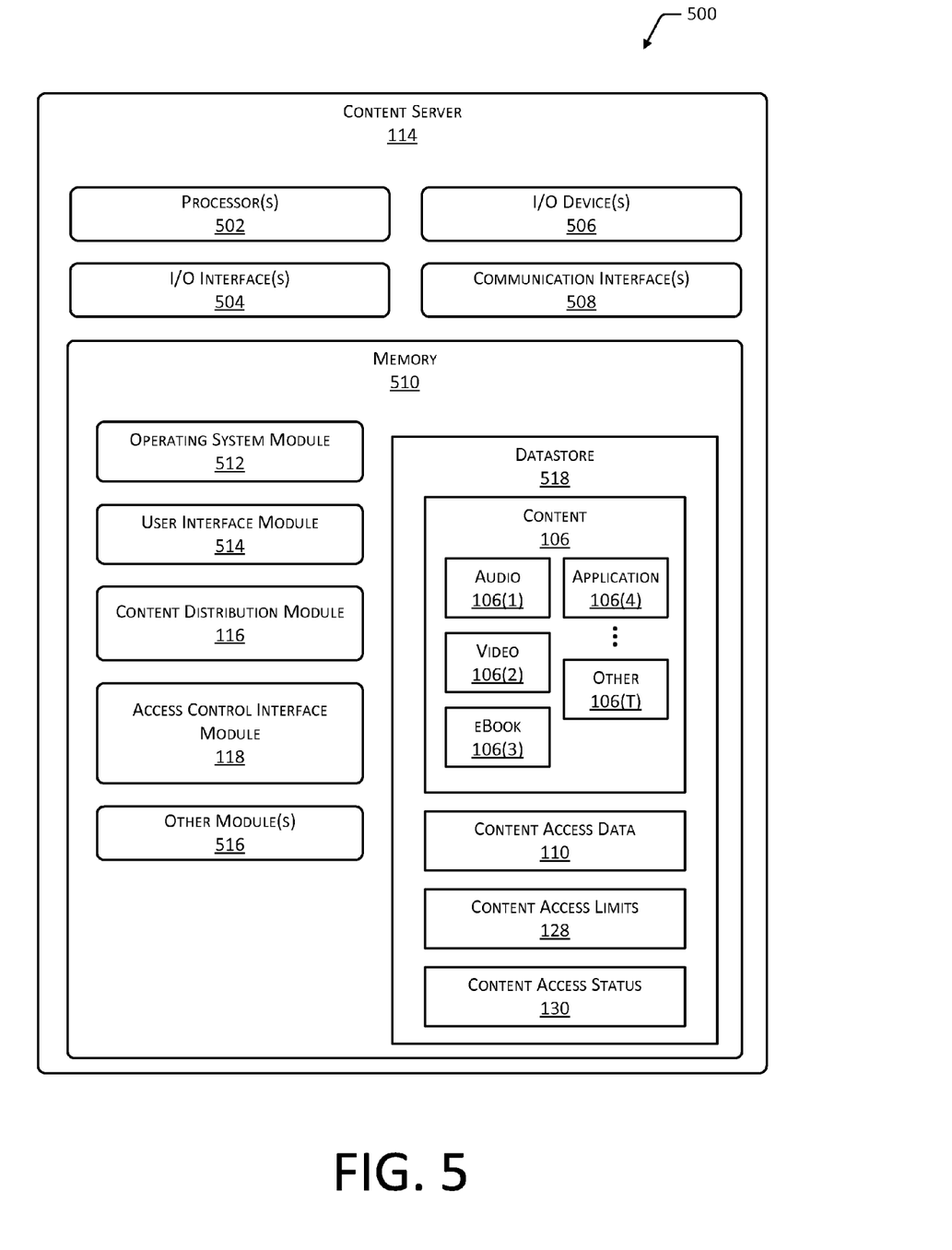
FIG. 5 illustrates a block diagram of a content server configured to support content access control by using content access status to allow or disallow access to content.

FIG. 5 illustrates a block diagram 500 of the content server 114 configured to support content access control. The content server 114 may include one or more processors 502 configured to execute one or more stored instructions. The processors 502 may comprise one or more cores. The content server 114 may include one or more I/O interface(s) 504 to allow the processor 502 or other portions of the content server 114 to communicate with other devices. The I/O interfaces 504 may comprise I2C, SPI, USB, RS-232, HDMI, TOSLINK®, analog video, analog audio, IEEE 1394, and so forth.

The I/O interface(s) 504 may couple to one or more I/O devices 506. The I/O devices 506 may include input devices such as one or more of a keyboard, scanner, and so forth. The I/O devices 506 may also include output devices such as one or more of a display, printer, and so forth. In some embodiments, the I/O devices 506 may be physically incorporated with the content server 114 or may be externally placed.

The content server 114 may also include one or more communication interfaces 508. The communication interfaces 508 are configured to provide communications between the content server 114 and other devices such as the media devices 104, routers, access points, the content access control server 120, and so forth. The communication interfaces 508 may be configured to couple to the network 112. For example, the communication interfaces 508 may include an Ethernet interface, Wi-Fi® interface, and so forth.

The content server 114 may also include one or more busses or other internal communications hardware or software that allow for the transfer of data between the various modules and components of the content server 114.

As shown in FIG. 5, the content server 114 includes one or more memories 510. The memory 510 comprises one or more CRSM, as described above. The memory 510 provides storage of computer readable instructions, data structures, program modules, and other data for the operation of the content server 114.

The memory 510 may include at least one OS module 512. The OS module 512 is configured to manage hardware resource devices such as the I/O interfaces 504, the I/O devices 506, the communication interfaces 508, and provide various services to applications or modules executing on the processors 502. Also stored in the memory 510 may be one or more of the following modules. These modules may be executed as foreground applications, background tasks, daemons, and so forth.

A user interface module 514 is configured to provide a user interface to the user 102. For example, the user interface module 514 may provide HTML which is sent to the media device 104 where it is rendered as the user interface 300 described above. The user interface may include one or more visual, audible, or haptic elements.

The content distribution module 116 may be stored in the memory 510. As described above, the content distribution module 116 is configured to provide content 106 to the one or more media devices 104 or other device. The content distribution module 116 may be configured to send content 106, such as by streaming, transfer entire content 106 files, and so forth. In some implementations, the content distribution module 116 may be configured to authorize, authenticate, validate, or otherwise enable operation of the content 106. For example, the content 106 may include an executable application which requires confirmation of licensing with the content server 114 prior to execution.

The content distribution module 116 may be configured to generate the content access data 110. In one implementation, the content access data 110 may be generated from user requests for content 106 to stream, information about applications authorized, information based on license key authentication, and so forth.

The access control interface module 118 may also be stored in the memory 510. The access control interface module 118 is configured to couple to the content access control server 120. For example, the access control interface module 118 may be configured to communicate with an API provided by the interface module 124 of the content access control server 120. The content server 114 may be configured to request, receive, or request and receive the content access status 130 for one or more users 102 which are accessing content 106 provided or supported by the content server 114. For example, in one implementation, the content access control server 120 may "push" or send the content access status 130 for one or more users 102 to the content server 114.

Other modules 516 may also be present. For example, a digital rights management module may provide support for presenting or processing content 106 which is protected using one or more digital rights management schemes.

The memory 510 may also include a datastore 518 to store information. The datastore 518 may use a flat file, database, linked list, tree, or other data structure to store the information. In some implementations, the datastore 518 or a portion of the datastore 518 may be distributed across one or more other devices including servers, network attached storage devices and so forth.

The datastore 518 may store a portion of the content 106 or the entire piece of content 106. The datastore 518 may also store content access data 110, content access limits 128, content access status 130, and so forth. Other data may also be stored. For example, the other data may include user preferences, configuration files, and so forth.

Figure 6:
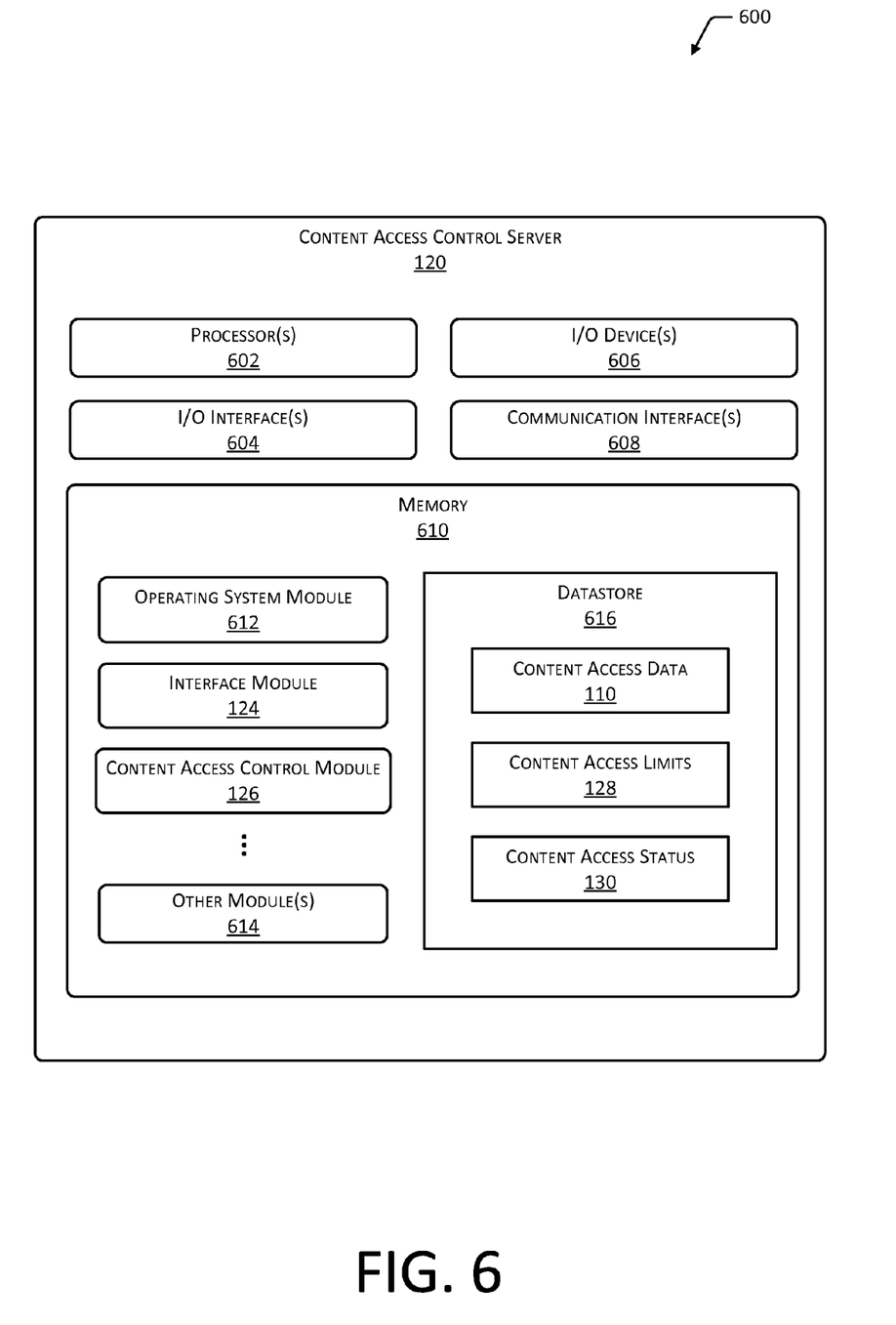
FIG. 6 illustrates a block diagram of a content access control server configured to acquire content access data and determine content access status for particular users.

FIG. 6 illustrates a block diagram 600 of the content access control server 120 configured to acquire content access data 110 and determine content access status 130 for particular users 102. The content access control server 120 may include one or more processors 602 configured to execute one or more stored instructions. The processors 602 may comprise one or more cores. The content access control server 120 may include one or more I/O interface(s) 604 to allow the processor 602 or other portions of the content access control server 120 to communicate with other devices. The I/O interfaces 604 may comprise I2C, SPI, USB, RS-232, HDMI, TOSLINK®, analog video, analog audio, IEEE 1394, and so forth.

The I/O interface(s) 604 may couple to one or more I/O devices 606. The I/O devices 606 may include input devices such as one or more of a keyboard, scanner, and so forth. The I/O devices 606 may also include output devices such as one or more of a display, printer, and so forth. In some embodiments, the I/O devices 606 may be physically incorporated with the content access control server 120 or may be externally placed.

The content access control server 120 may also include one or more communication interfaces 608. The communication interfaces 608 are configured to provide communications between the content access control server 120 and other devices such as the media devices 104, routers, access points, the content servers 114, and so forth. The communication interfaces 608 may be configured to couple to the network 112. For example, the communication interfaces 608 may include an Ethernet interface, Wi-Fi® interface, Bluetooth® interface, ZigBee® interface, and so forth.

The content access control server 120 may also include one or more busses or other internal communications hardware or software that allow for the transfer of data between the various modules and components of the content access control server 120.

As shown in FIG. 6, the content access control server 120 includes one or more memories 610. The memory 610 comprises one or more CRSM, as described above. The memory 610 provides storage of computer readable instructions, data structures, program modules, and other data for the operation of the content access control server 120.

The memory 610 may include at least one OS module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

The memory 610 may store the interface module 124. As described above, the interface module 124 is configured to provide one or more interfaces between the content access control server 120 and other devices such as the media devices 104 or services on other servers such as the content servers 114.

The interface module 124 may be configured to provide a user interface, such as that described in FIG. 3, to the users 102 through the media devices 104. The user interface may be used to configure the content access limits 128 and the conditions associated with those limits. In one implementation, the user interface may comprise a web page.

The interface module 124 may be configured to provide an API. For example, the content server 114 may use the API of the interface module 124 to receive the content access data 110, respond to requests for content access status 130 about the user 102, and so forth.

The memory 610 may also store the content access control module 126. As described above, the content access control module 126 is configured to accept as inputs at least a portion of the content access data 110 and at least one or more content access limits 128. Based at least in part on these inputs, the content access control module 126 generates the content access status 130. The content access status 130 may then be used by the media device 104, the content server 114, or other devices to allow or disallow access to the content 106.

The content access control module 126 may be configured to use the content access data 110 to enforce the constraints in the content access limits 128 based on concurrent usage against real time or strict serial usage. For example, the user 102 may access two pieces of content 106 simultaneously, resulting in concurrent usage. Continuing the example, an eBook may be open for reading for 15 minutes while a video is playing for the same 15 minutes. The content access control module 126 may be configured to count this as either concurrent usage such that total consumption is 15 minutes or as strict serial usage of 30 minutes. In other implementations, other distribution of timing for concurrent consumption may be used.

Other modules 614 may also be present. For example, a user authentication module may be configured to authenticate the user 102 on the media device 104.

The memory 610 may also include a datastore 616 to store information. The datastore 616 may use a flat file, database, linked list, tree, or other data structure to store the information. In some implementations, the datastore 616 or a portion of the datastore 616 may be distributed across one or more other devices including servers, network attached storage devices, and so forth.

The datastore 616 may store a portion of the content access data 110, the content access limits 128, the content access status 130, and so forth. Other data (not shown) may also be stored. For example, the other data may include authentication data, configuration files, and so forth.

Illustrative Scenarios and Processes

Figure 7:
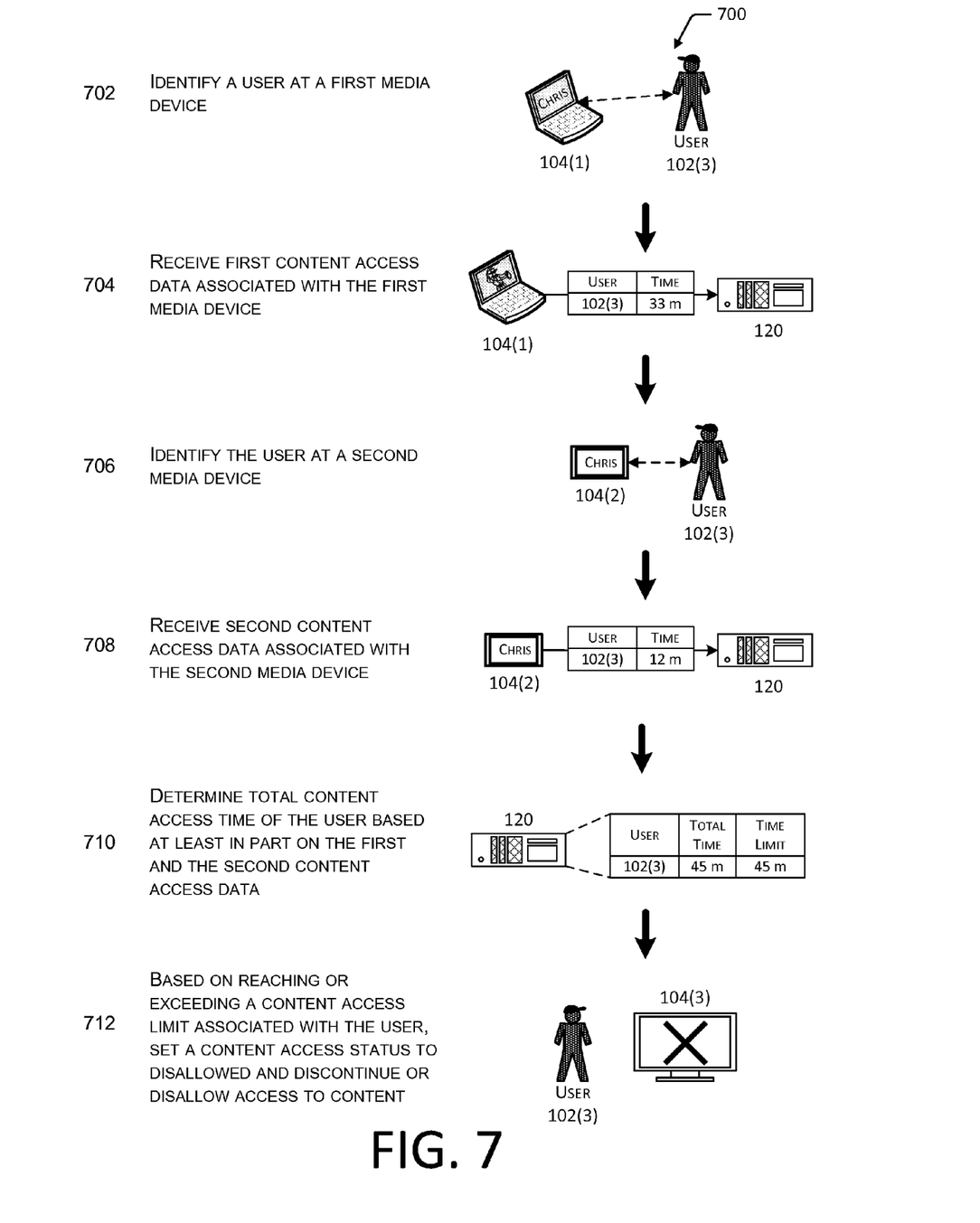
FIG. 7 illustrates a scenario in which content access data from several devices is acquired and used to limit access to content.

FIG. 7 illustrates a scenario 700 in which the content access data 110 from several media devices 104 is acquired and used to limit access to the content 106.

At 702, the user 102(3) is identified at a first media device 104(1). For example, the user 102(3) may have entered a password, presented a security token, been recognized by a facial recognition module, and so forth.

At 704, the content access control server 120 receives first content access data 110(1) associated with the first media device 104(1). In one implementation, the client control module 108 executing on the media device 104(1) may have sent the content access data 110 to the content access control server 120. In another implementation, the content server 114, which is providing content 106 to the media device 104(1), may have sent the content access data 110.

At 706, the user 102(3) is identified at a second media device 104(2). For example the user 102(3) may be using the media devices 104(1) and 104(2) concurrently, or may have switched from one media devie 104 to another.

At 708, the content access control server 120 receives second content access data 110(2) associated with the second media device 104(2). As described above, this information may be provided by several implementations.

At 710, the content access control server 120 determines a total content access time 208, cost 210, or other metric associated with the user 102(3), based at least in part on the first content access data 110(1) and the second content access data 110(2). For example, the content access control server 120 may determine the time used 306 for the user 102(3) as 45 minutes. In another example, the content access control server 120 may determine the cost 308 is $3.50.

At 712, based on reaching or exceeding one or more of the content access limits 128 associated with the user 102(3), the content access control server 120 sets the content access status 130 associated with the user 102(3) to "disallowed." Once disallowed, access to the content 106 may be disallowed, discontinued, degraded, and so forth, as described above.

Figure 8:
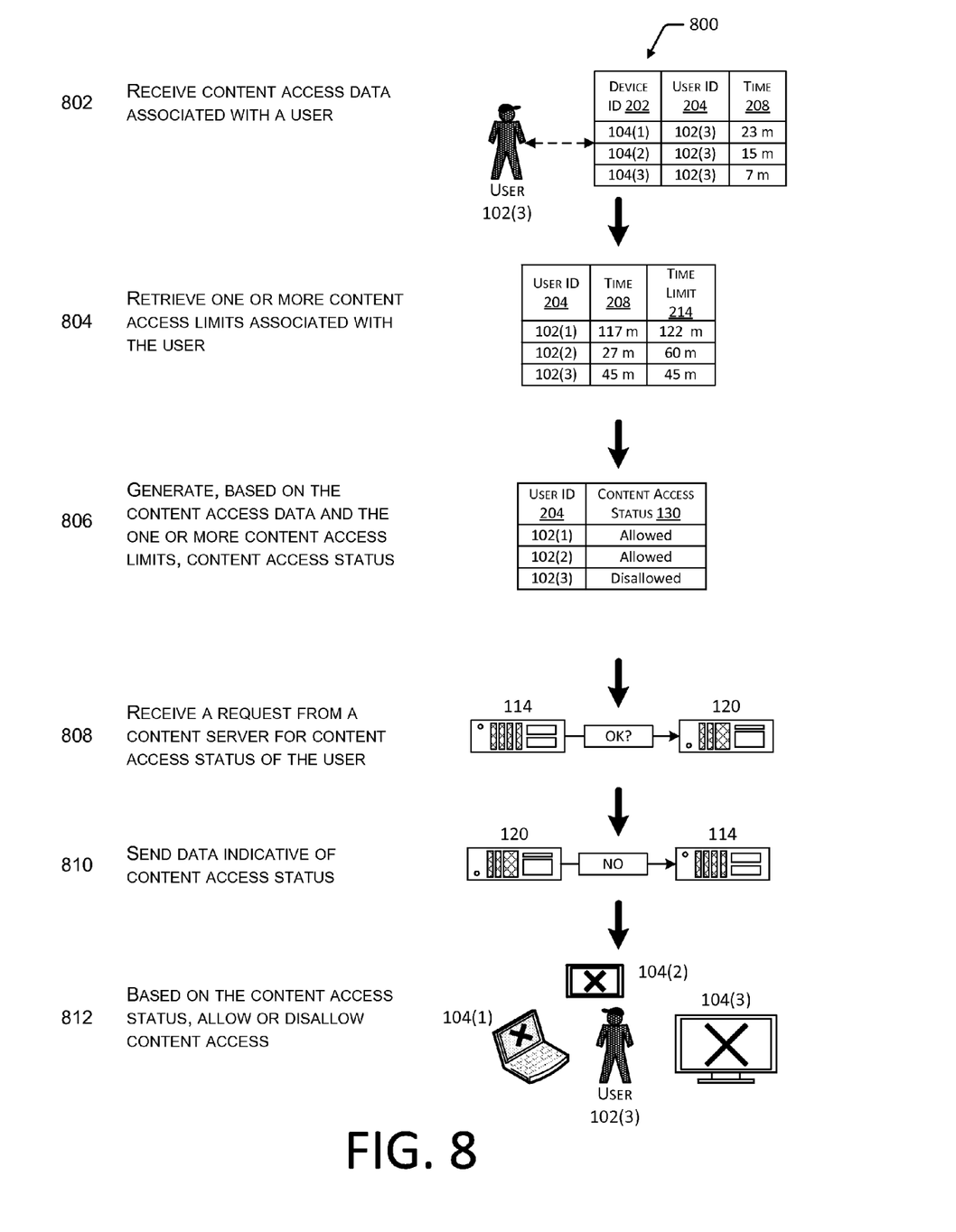
FIG. 8 illustrates a scenario in which the content access control server determines content access status of a user and provides status information to a requesting content server.

FIG. 8 illustrates a scenario 800 in which the content access control server 120 determines the content access status 130 of the user 102 and provides the status information to the requesting content server 114.

At 802, the content access control server 120 receives the content access data 110 associated with the user 102. The content access data 130 may be associated with the user 102 and a plurality of the media devices 104. For example, as shown here, the content access data 110 indicates usage in minutes for the user 102(3) on the media devices 104(1)-(3). The sources for the content access data 110 may include one or more of the media devices 104, the content servers 114, network devices, caching servers, content delivery network servers, manual input, and so forth.

At 804, one or more content access limits 128 associated with the user 102 are retrieved. For example, as shown here, the user 102(3) has a time limit 214 of 45 minutes, and the time used 208 is 45 minutes. As discussed above, the content access limits 128 may be defined in terms of time 208, cost 210, or other metrics associated with user 102.

At 806, the content access control server 120 generates, based at least in part on the content access data 110, the content access status 130 which specifies whether the one or more content access limits 128 associated with the user 102 have been met or exceeded. Continuing the example, the user 102(3) has a content access status 130 which disallows access to content 106. As described above, the content access status 130 may be specific to content category 212 or other attributes. In some implementations, the content access status 130 may indicate a range of time for which that content access status 130 is deemed valid, an expiration or a reset date, and so forth.

At 808, the content access control server 120 receives a request from the content server 114 for content access status 130 of the user 102. In one implementation, this request may be made as a hypertext transport protocol ("HTTP") "GET" request.

At 810, the content access control server 120 retrieves the content access status 130 and sends data indicative of the content access status 130 to another device, such as the requesting device. In some implementations, the requesting device and the receiving device may be different. For example, the media device 104 may request the content access status 130, but that information may be provided directly to the content server 114. As also described above, in another implementation, the content access status 130 may be "pushed" or sent to other devices such as the content servers 114.

The disallowed content access status 130 is configured to discontinue or prevent access to content 106 by the user 102. For example, the client control module 108 may be configured to close executing application content 106 upon receiving the content access status 130 of "disallowed". In comparison, data indicative of the "allowed" content access status 130 permits the content 106 to be accessed.

At 812, based on the content access status 130, access to the content 106 is allowed or disallowed. For example, the content server 114 may prevent or discontinue streaming of video content 106, or the client control module 108 may prevent the application content 106 from executing.

Figure 9:
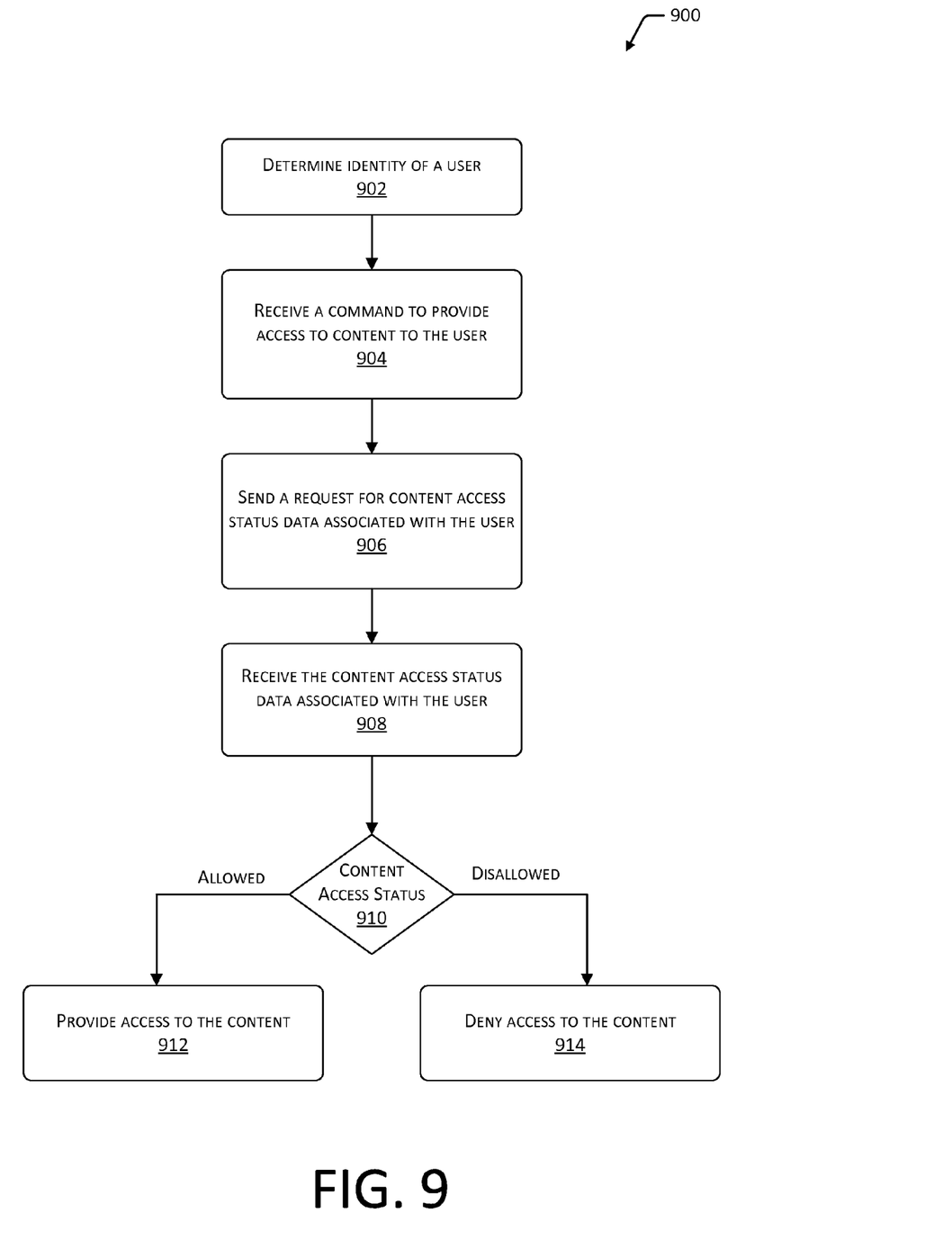
FIG. 9 is a flow diagram of a process of using content access status to allow or disallow user access to content.

FIG. 9 is a flow diagram 900 of a process of using the content access status 130 to allow or disallow the user 102 access to content 106. This process is written from the point of view of the media device 104 and may be executed at least in part by the client control module 108.

Block 902 determines an identity of the user 102. The media device 104 may determine the identity of the user 102 by acquiring one or more of a password, image, sound, or biometric data associated with the user 102 and comparing that acquired data with previously stored data to find a match or correspondence. In one implementation, the media device 104 may use facial recognition to determine the identity of the user 102.

Block 904 receives a command to provide the user 102 with access to the content 106. For example, the user 102 may have selected application content 106 to execute on the media device 104 using the user interface provided by the user interface module 414.

Block 906 sends a request for content access status 130 data associated with the user 102. For example, the client control module 108 may send an HTTP GET request to the interface module 124 of the content access control server 120. The request may comprise data indicative of the content 106, such as one or more of a content identifier 206, a content title, content category 212, uniform resource identifier ("URI"), a uniform resource locator ("URL"), and so forth.

As described above, the content access status 130 may be based on the content access data 110. The content access data 110 provides information about previous access by the user 102 to one or more pieces of content 106 across a plurality of media devices 104.

As also described above, the content access status 130 is determined based at least in part on one or more content access limits 128 configured to specify, for the user 102, one or more restrictions on access to content 106. These restrictions may be based on one or more of a maximum time, a maximum cost, content category 212, and so forth. As also described above, the one or more content access limits 128 may be based at least in part on the data indicative of the content 106. For example, the content identifier 206, content category 212, and so forth.

Block 908 receives the content access status 130 data associated with the user 102. For example, the client control module 108 may receive an HTTP response containing the content access status 130.

Block 910 processes the content access status 130 data which was received to determine the content access status 130. When the content access status 130 is determined to indicate that content access status 130 is allowed, the process proceeds to block 912. Block 912, based at least in part on the allowed content access status 130, provides the user 102 with access to the content 106.

Returning to block 910, when the content access status 130 is determined to indicate the content access status 130 is disallowed, the process proceeds to block 914. Block 914, based at least in part on the disallowed content access status 130, denies the user 102 access to the content 106. This denial may include terminating access, preventing access, degrading access, and so forth.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium, and so forth. Separate instances of these programs can be executed on or distributed across separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system, comprising:
   at least one memory storing computer-executable instructions; and at least one processor configured to access the at least one memory, and execute the computer-executable instructions to:

receive content access data associated with a user from a plurality of media devices, wherein the content access data is indicative of presentation of content to the user using one or more of the plurality of media devices;

retrieve one or more content access limits associated with the user, wherein at least a portion of the one or more content access limits are defined by a parental user account associated with the user;

determine, based at least in part on the content access data, that the one or more content access limits have been met or exceeded;

designate a content access status of the user as disallowed;

receive a request from a content server for the content access status of the user; and send data indicative of the disallowed content access status, wherein the disallowed content access status is configured to discontinue or prevent access to the content by the user, for which the user already has digital rights management credentials, using the one or more of the plurality of media devices.

2. The system of claim 1, wherein the content access data comprises information indicative of user access to the content with the one or more of the plurality of media devices, the content access data including one or more of:
time the content has been accessed,
cost associated with access of the content, or
category type of the content.

3. The system of claim 1, wherein the content access limits specify one or more of a maximum time, a maximum cost, or a content category.

4. The system of claim 1, wherein the content access limits further comprise one or more conditions configured to initiate modification of the one or more of the content access limits.

5. The system of claim 4, the one or more conditions comprising one or more of:
elapsed time period;
particular date or time;
access by the user to predetermined content; or
presence of the user at a predetermined location.

6. The system of claim 1, wherein the content comprises one or more of audio data, video data, eBook data, or an executable application.

7. A computer-implemented method for controlling access to content on one or more devices comprising:
determining an identity of a user;
receiving a command to provide the user with access to the content;
sending a request for content access status data associated with the user;
receiving the content access status data associated with the user, wherein the content access status data is based at least in part on content access data indicative of consumption of the content by the user across the one or more devices;
determining the content access status data indicates content access by the user is allowed; and
based at least in part on the allowed content access status data, providing the user access to the content for which the user otherwise has digital rights management credentials to access.

8. The method of claim 7, the identifying comprising acquiring one or more of a password, image, sound, or biometric data associated with the user.

9. The method of claim 7, wherein the content access status data is based at least in part on previous access by the user to a plurality of pieces of content from a plurality of media devices.

10. The method of claim 7, wherein the content access status data is based at least in part on one or more content access limits configured by an individual to specify, for the user, one or more restrictions on access to content based on one or more of: a maximum duration of time to present, a maximum cost, or content category.

11. The method of claim 7, wherein the request comprises data indicative of the content, the data comprising one or more of a content identifier, a content title, uniform resource identifier, or uniform resource locator.

12. The method of claim 11, wherein the content access status data is based at least in part on one or more content access limits, and further wherein the content access limits are based at least in part on the data indicative of the content.

13. The method of claim 7, further comprising:
determining the content access status data indicates content access is disallowed; and
based at least in part on the disallowed content access status, denying access to the content for which the user otherwise has digital rights management credentials to access.

14. A method comprising:
receiving content access data associated with a user, wherein the content access data comprises information indicative of access to one or more pieces of content by the user with one or more media devices;
accessing one or more content access limits associated with the user, wherein the one or more content access limits are configured to constrain access by the user to content; and
generating, based on the content access data and the one or more content access limits, content access status data indicative of permission of the user to access content using any number of the one or more media devices, wherein the content access data is distinct from digital rights management credentials associated with the one or more pieces of content.

15. The method of claim 14, wherein the content access data is generated by one or more media devices, one or more servers, or both.

16. The method of claim 14, further comprising sending the content access status data to a media device, wherein the media device is configured to control the user access to content based at least in part on the content access status data.

17. The method of claim 14, further comprising sending the content access status data to a server, wherein the server is configured to provide content to the user based at least in part on the content access status data.

18. The method of claim 14, wherein the one or more content access limits specify one or more of a maximum duration of time allowed for access of the content, a maximum cost associated with consumption of the content, or a content category to which the content is associated.

19. The method of claim 14, the content comprising one or more of audio data, video data, eBook data, or an executable application.

20. The method of claim 14, further comprising:
receiving a request for the content access status data associated with the user; and
sending the content access status data.

21. The method of claim 14, wherein the content access limits further comprise one or more conditions configured to initiate modification of the one or more of the content access limits, the conditions comprising one or more of:
- elapsed time period;
- particular date or time;
- access by the user to predetermined content;
- presence of the user at a predetermined location; or
- input from a third-party.

* * * * *